(12) United States Patent
Koyuncuoglu et al.

(10) Patent No.: US 7,450,494 B2
(45) Date of Patent: Nov. 11, 2008

(54) RECONFIGURABLE APPARATUS PROVIDING 1:N AND 1:1 EQUIPMENT REDUNDANCY FOR HIGH SPEED BROADBAND INTERFACES WITH 1+1 AND 1:N AUTOMATIC PROTECTION SWITCHING

(75) Inventors: Akin Koyuncuoglu, Santa Clara, CA (US); Biju Raghavan Nair, Sunnyvale, CA (US); Cedric Elg, Gilroy, CA (US); Hang Tran, San Jose, CA (US); Rajesh Edamula, Santa Clara, CA (US); Reetesh Kapahi, Karnataka (IN); Santosh Kuzhumiyil Koroth, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 841 days.

(21) Appl. No.: 10/934,268

(22) Filed: Sep. 3, 2004

(65) Prior Publication Data
US 2006/0050631 A1    Mar. 9, 2006

(51) Int. Cl.
  *G01R 31/08*  (2006.01)
  *H04L 12/66*  (2006.01)
(52) U.S. Cl. ............... 370/216; 370/367; 370/386
(58) Field of Classification Search .......... None
  See application file for complete search history.

(56) References Cited

U.S. PATENT DOCUMENTS

| | | | |
|---|---|---|---|
| 5,365,510 A * | 11/1994 | Nicholson et al. ........... 370/222 |
| 6,611,867 B1 | 8/2003 | Bowman-Amuah ......... 709/224 |
| 6,671,818 B1 | 12/2003 | Mikurak ........................ 714/4 |
| 6,704,303 B1 | 3/2004 | Bowman-Amuah ......... 370/352 |
| 6,707,812 B1 | 3/2004 | Bowman-Amuah ......... 370/353 |
| 6,754,181 B1 | 6/2004 | Elliott et al. ................. 370/252 |
| 6,876,660 B1 * | 4/2005 | Hughes et al. ............. 370/395.4 |
| 7,031,261 B1 * | 4/2006 | Mao et al. .................... 370/244 |
| 7,151,741 B1 * | 12/2006 | Elliot et al. ................. 370/218 |
| 7,310,333 B1 * | 12/2007 | Conklin et al. .............. 370/388 |

* cited by examiner

*Primary Examiner*—Chi H. Pham
*Assistant Examiner*—Soon D. Hyun
(74) *Attorney, Agent, or Firm*—BainwoodHuang

(57) ABSTRACT

A reconfigurable apparatus providing 1:N redundancy and 1:1 redundancy for high speed broadband interfaces with 1+1 and 1:N Automatic protection Switching (APS), is presented. The apparatus includes a mini-midplane having a redundant slot, a plurality of active slots and capable of communication with a gateway. The mini-midplane includes at least one set of cross-coupled APS lines for implementing 1:1 equipment redundancy for high speed broadband interfaces with 1+1/1:N APS and a plurality of point-to-point traces between redundant slot and each of the active slots for implementing 1:N equipment redundancy for high speed broadband interfaces with 1+1/1:N APS. The mini-midplane may further include a plurality of shared traces between the redundant slot and said at least one active slot for implementing 1:N equipment protection for low speed narrowband interfaces. The apparatus further comprises a redundant back card inserted in the redundant slot and in communication with the mini-midplane, and a plurality of back cards, wherein a respective one of the plurality of back cards are inserted in a respective active slot, each of the back cards in communication with mini-midplane.

29 Claims, 12 Drawing Sheets

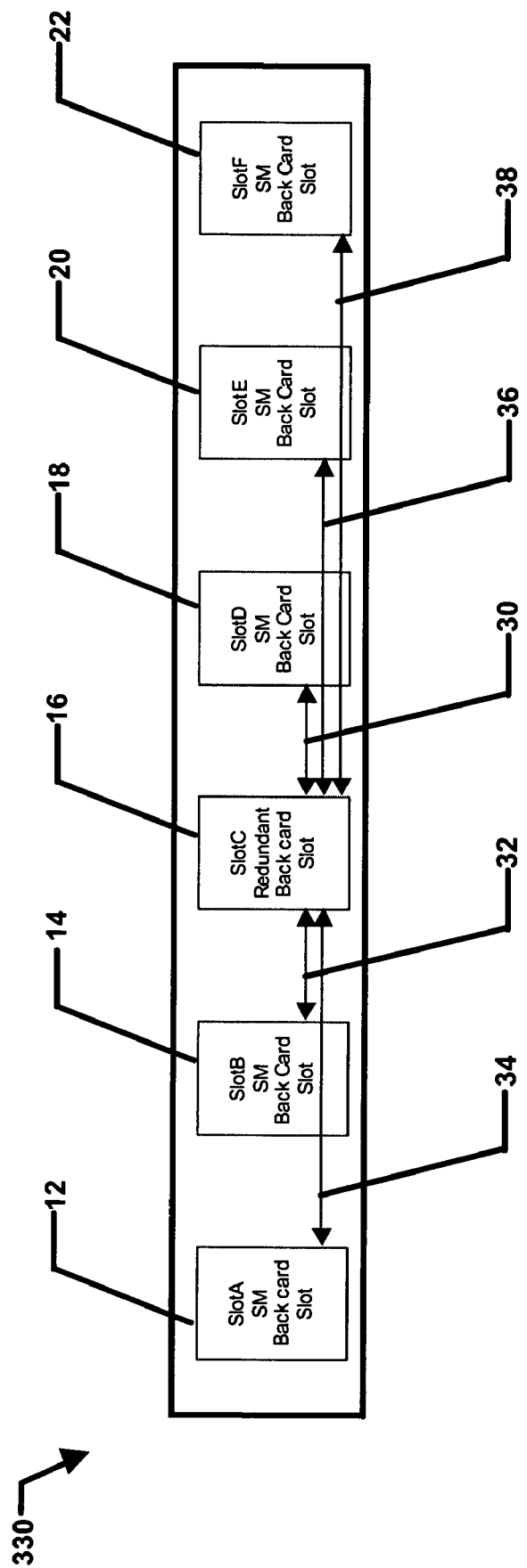

RECONFIGURABLE APPARATUS PROVIDING 1:N AND 1:1 EQUIPMENT REDUNDANCY FOR HIGH SPEED BROADBAND INTERFACES WITH 1+1 AND 1:N AUTOMATIC PROTECTION SWITCHING

BACKGROUND

The Public Switched Telephone Network (PSTN) is one of the most reliable networks in the world. Reliable phone service plays an important role in the everyday life of business and residential subscribers. One contributing factor in providing PSTN reliability is redundancy.

Redundancy in this context is the ability of telecommunications equipment to continue operation without service outages in the case of failure of any component of the telecommunications equipment. To achieve a high degree of availability, telephone services can only be unavailable a few minutes a year, which is commonly referred to as 99.999% (also referred to as "five nines") availability. A highly redundant platform minimizes these outage periods and downtime. Outages due to software, hardware and environmental conditions contribute to a significant percentage of telephone network downtime. Through fault tolerant design, telecommunication equipment vendors play a significant role in ensuring that these telephone outages are minimized.

In a carrier class redundant system, the software design leverages the hardware redundancy model to minimize the impact to system availability during outage periods and maintenance activities. Software-based recovery mechanisms are used to complement physical redundancy by minimizing the impact on subscriber traffic when a failure occurs in the primary service path. This is achieved by automating the recovery process to ensure the fastest possible failover to backup resources in order to minimize packet loss during failover. If restoration is fast enough, failure events are transparent to the subscriber.

Hardware redundancy typically involves using one or more spare devices to compensate for a failed device during normal system operation. Upon failure of a primary device, a secondary device assumes operation with no interruption in service. This combination of a primary device and a secondary device comprises the minimum set for a protection group. Redundant devices in voice gateway products include module, port, timing system and power system redundancy.

Modules (also referred to as cards) provide system control and I/O functionality in voice gateway equipment. Each module is redundant in order to guarantee carrier class redundancy. There are different redundancy techniques used depending on the type of module that is installed in the gateway.

One type of redundancy is known as 1:1 equipment redundancy and is typically used for system controller modules and broadband I/O interface modules. In a 1:1 redundancy scheme, one primary module and one secondary module comprise one protection group. That is, each primary module is matched with a secondary module. If the primary module fails, the secondary module can quickly assume traffic responsibilities because of its dynamic data synchronicity with the primary module.

Another type of redundancy is known as 1:N equipment redundancy and is used to maximize the number of in-service I/O interfaces because one secondary module can back up N primary modules in a protection group. This is especially relevant in trunking applications, as duplication of interface modules can be expensive and 1:N redundancy minimizes the cost of leasing spare lines. In 1:N configurations, the spare module cannot be fully configured because its exact configuration is not completely known until one of the primary modules in the protection group fails. At that time the secondary card is updated and takes control of the traffic for the failed module. For this reason, the switchover time for 1:N equipment redundancy is typically higher in comparison to 1:1 equipment redundancy.

Still another type of redundancy is known as Automatic Protection Switching (APS). There are two types of APS, namely 1+1 APS and 1:N APS. 1+1 APS uses one working line and one protection line. Switchover from the working line to the protection line is triggered by defects such as a loss of signal at the receiver. This means 100% redundancy, because there is a spare protection line for each working line. The second type of APS is known as 1:N APS wherein N different working lines share a spare line for backup. Economic considerations have made the 1:N APS architecture more preferred than 1+1 APS.

SUMMARY

Conventional mechanisms such as those explained above suffer from a variety of deficiencies. One such problem is that conventional systems do not support 1:N equipment redundancy for high speed broadband interfaces of service modules along with 1+1/1:N APS capability on these high speed interfaces. Most of the conventional systems are designed with 1:N Equipment Redundancy capability on their narrowband interface service modules. Accordingly, an upgrade of the chassis (referred to as a "forklift upgrade") is required to implement this feature for high speed broadband interfaces, which is a severe limitation, as customers desire 1:N equipment redundancy for high speed broadband interfaces to maximize the density in the platforms.

Another deficiency is that conventional systems do not support 1:1 equipment redundancy with 1+1 and 1:N APS configuration for high speed Synchronous Optical Network/Synchronous Digital Hierarchy (SONET/SDH) interfaces with enough scalability to address the future 1:N equipment redundancy requirements of the service providers so forklift upgrade of the chassis is required in this case also to implement this feature in the chassis, which again is very severe from the customer perspective.

Yet another shortcoming is that in conventional systems 1:N or 1:1 equipment redundancy cannot be implemented with flexibility in the existing chassis as the infrastructure cost is too high for a fully redundant system since this would require every primary module to be protected with a secondary module. In addition to that, the chassis as a whole is not scalable for meeting the market requirements for high port density, which limit the effectiveness of port density supported by the chassis.

Another drawback is that in conventional systems 1:N line protection for high speed broadband interfaces (e.g., 1:N APS for SONET/SDH) cannot be implemented in the existing chassis with 1:N equipment redundancy.

Yet still another drawback is that in conventional systems the mid-plane is physically attached (e.g., screwed) to the chassis, and any failure on the shared multipoint narrowband interface buses, which are used for providing 1:N equipment protection for narrowband T1/E1 interfaces, can cause a single point of failure. The removal of the mid-plane is not possible without bringing down the whole chassis, which is quite severe in carrier class systems.

Embodiments of the invention significantly overcome such deficiencies and present mechanisms and techniques that provide an apparatus supplying 1:N and 1:1 equipment redundancy for high speed broadband interfaces with 1+1 and 1:N automatic protection switching for a gateway.

A gateway apparatus includes a mini-midplane having a redundant back card and a plurality of back cards by which 1:N equipment redundancy for high-speed broadband interfaces with 1:N/1+1 APS can be achieved. N can be 1, 2, 3, 4 or 5 in a particular implementation for equipment redundancy. N can be 1, 2, 3 or 4 in a particular implementation for 1:N APS. There are point-to-point high-speed traces from each to primary service module back card to the secondary service module back card, which are used in the event of failure for switching the data paths. The point-to-point control paths have also been provided to manage the back cards of the failed primary service module.

All of these interfaces are designed to be point-to-point to avoid a single point of failure in these implementations. This enables the gateway chassis to be 1:N equipment redundancy capable without forklifting the chassis in the existing customer base.

The same mini-midplane, redundant back card and plurality of back cards are also capable of providing 1:1 equipment redundancy with 1+1 APS configuration for high-speed broadband interfaces with enough flexibility to be able to scale in the future for high port density requirements for 1:N equipment redundancy with 1:N APS configurations.

1:N APS for SONET/SDH is implemented for high-speed broadband interfaces without losing 1:N equipment redundancy or 1:1 equipment redundancy. N can be maximum of 4 for line protection (1:N APS) in a particular implementation.

As the present invention includes point-to-point high-speed traces for 1:N equipment redundancy implementation, a large number of T1/E1s worth of narrowband interfaces can be supported in an innovative manner. In a particular embodiment, 24 T1/E1 interfaces are mapped in a Framer/Mapper device to one single high speed Synchronous Transport Signal STS-3 interface to address the lower range port density requirement to lower the per port cost. This enables the half height service modules in a particular embodiment to provide higher port densities by using the processing power of the latest chipsets in the market for optimizing the costs.

There is no single point of failure for implementing 1:N equipment redundancy for high speed broadband interfaces in the mini-midplane as all the high-speed traces utilized for broadband interfaces are point-to-point. The control paths required for managing the back cards are also point-to-point. In this particular embodiment, there are also 16 T1/E1 worth of multipoint traces provided for implementing 1:N equipment redundancy for low speed narrowband interfaces in traditional manner with relays which can cause some single point of failure but as the provision has been made to remove this mini-midplane from the respected quadrant of the gateway chassis, there is no need for bringing down the whole chassis but just the respective quadrant service will be affected. This provides better availability compared to the existing 16 T1/E1 solution for these narrowband interfaces for a similar failure.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4D is a block diagram showing a configuration for 1:5 front card redundancy;

DETAILED DESCRIPTION

Even some of the highest-quality products fail, often during times of stress loading, when they are needed the most. Fault tolerant systems seek to minimize the effects individual component failures and the effects such failures have on overall service capacity. The present apparatus helps in making sure that the gateway chassis is fault tolerant for 1:N equipment redundancy requirements while also addressing the highest port density requirement.

The present invention, in a particular embodiment, provides 1:N equipment protection with the added flexibility of supporting 1:1 equipment protection for high-speed broadband interfaces, including 1+1/1:N APS, all using the same hardware. The present invention is also able to provide 1:N line protection (1:N APS) for high-speed broadband SONET/SDH interfaces. In order to provide the above features seamlessly into the existing gateway chassis, a mini-midplane architecture that is electrically and mechanically robust is used. Prior to the introduction of the mini-midplane (also referred to simply as "RCON") there was no hardware that provided the above features.

The mini-midplane of the present apparatus is mountable on the backside of a gateway chassis to provide 1:N/1:1 equipment redundancy for the high-speed broadband SDH/SONET interfaces with 1+1/1:N APS.

Figure 1:
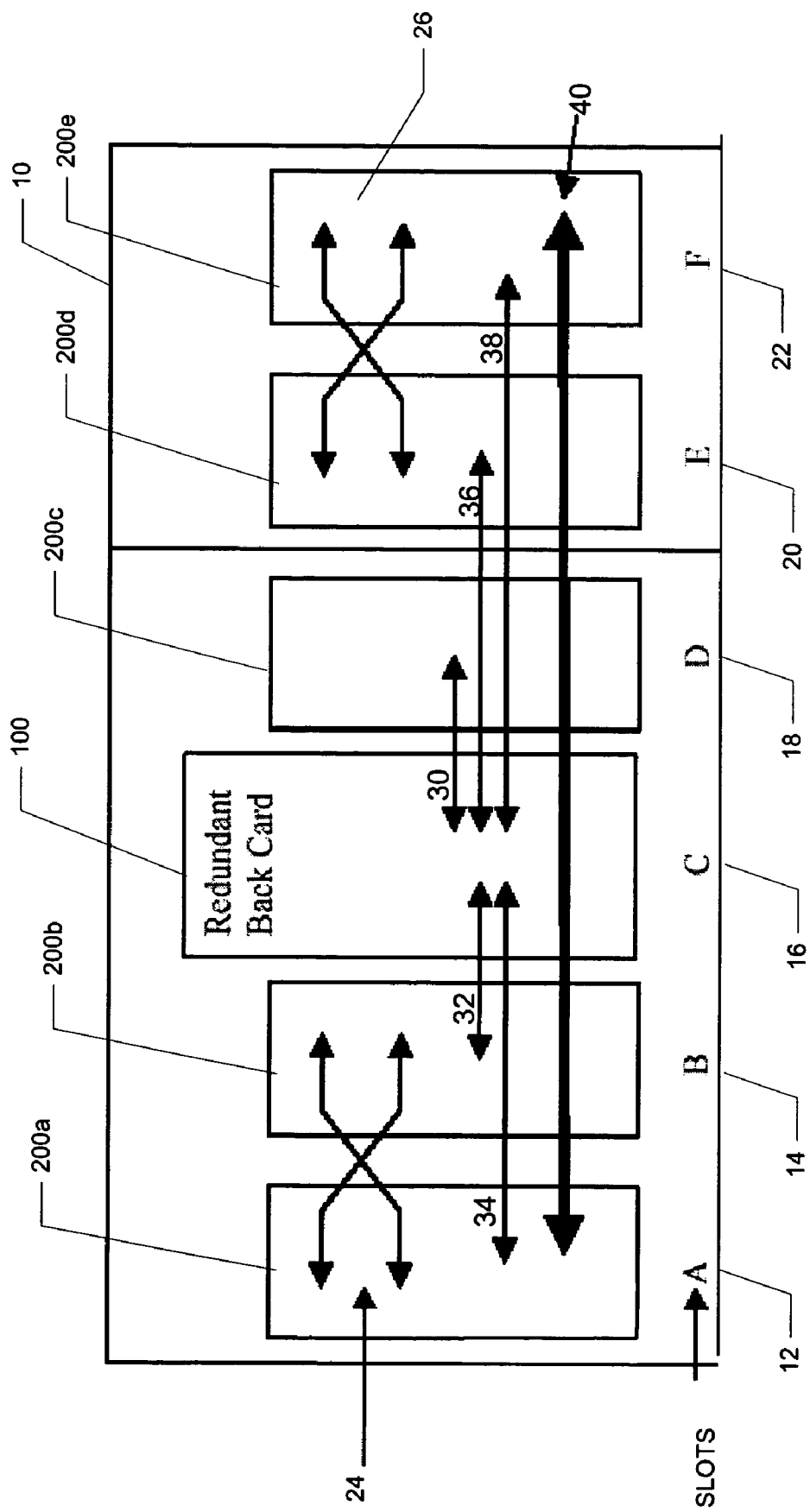
FIG. 1 comprises a high-level block diagram of the apparatus providing 1:N and 1:1 equipment redundancy for high speed broadband interfaces with 1+1 and 1:N automatic protection switching.

Referring now to FIG. 1, a block diagram of a particular embodiment of a reconfigurable apparatus providing 1:N redundancy and 1:1 redundancy for high speed broadband interfaces with 1+1 and 1:N Automatic Protection Switching (APS), is shown. The apparatus includes a mini-midplane 10 having six slots which are generally labeled A through F. In particular, the mini-midplane 10 includes a redundant slot 16, and a plurality of active slots 12, 14, 18, 20, and 22. The mini-midplane 10 includes at least one set of cross-coupled APS lines 24 between a first active slot 12 and a second active slot 14 for implementing 1:1 equipment redundancy and a plurality of point-to-point traces 32, 34, 30, 36 and 38 between redundant slot 16 and each of the active slots 12, 14, 18, 20 and 22 respectively for implementing 1:N equipment redundancy for high speed broadband interfaces. The mini-midplane 10 may further include a plurality of shared traces 40 between the redundant slot 16 and said at least one active slot for implementing 1:N Redundancy for low speed narrow-band interfaces. The apparatus further comprises a redundant back card 100 (described in detail below) inserted in the redundant slot 16 and in communication with the mini-midplane 10. The apparatus additionally comprises a plurality of back cards 200 (described in detail below), wherein a respective one of the plurality of back cards are inserted in a respective active slot (e.g., slot 12) of the plurality of active slots 12, 14, 18, 20 and 22, each of the back cards 200 in communication with mini-midplane 10.

The mini-midplane 10 provides the data path between the redundant back card 100 and optical transceivers on back cards 200a-200e, which are configured in 1:N redundancy group via the apparatus. The redundant slot 16 is reserved for a redundant back card to optimize signal integrity as well as routing constraints and to keep a fixed slot location for 1:3 as well as 1:5 configurations.

Figure 2:
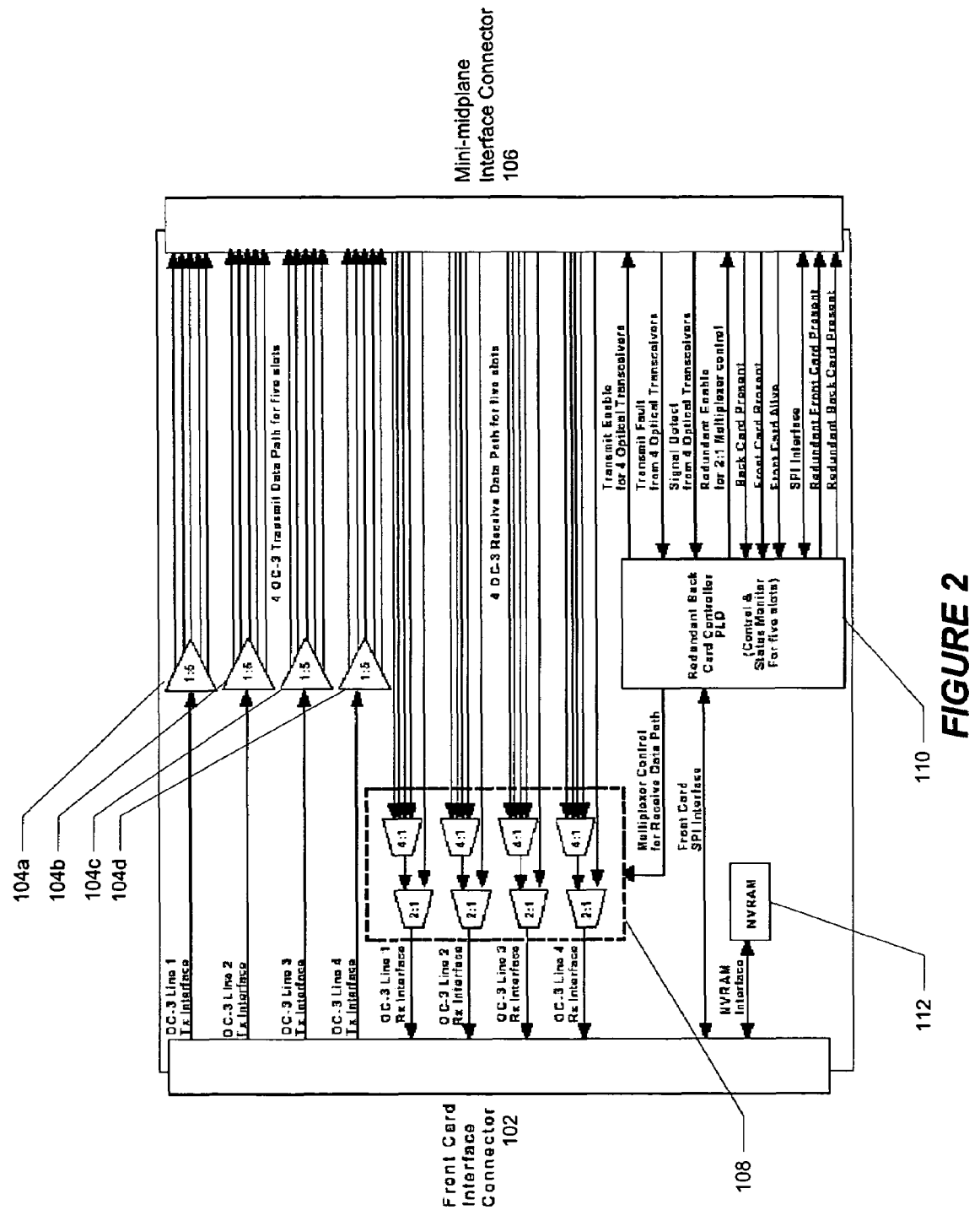
FIG. 2 is a block diagram of a redundant back card with no line interface.

Referring now to FIG. 2, a block diagram of a particular embodiment of a redundant back card 100 is shown. The redundant back card 100 provides the data path between the framers present on redundant front card and the optical transceivers on the back cards, which are configured in a 1:N equipment redundancy group via the mini-midplane. The redundant back card 100 is insertable in the redundant slot 16 of the mini-midplane. The transmit path for 4 OC-3 lines from a front card is received at a front card interface connector 102, buffered by buffers 104a-104d and sent to five different slots on the mini-midplane via mini-midplane interface connector 106. The receive path for 4 OC-3 lines from five slots is received at mini-midplane interface connector 106, multiplexed by multiplexer 108 and sent to the front card through the front card interface connector 102. The redundant back card controller 110 controls multiplexer 108.

Figure 3:
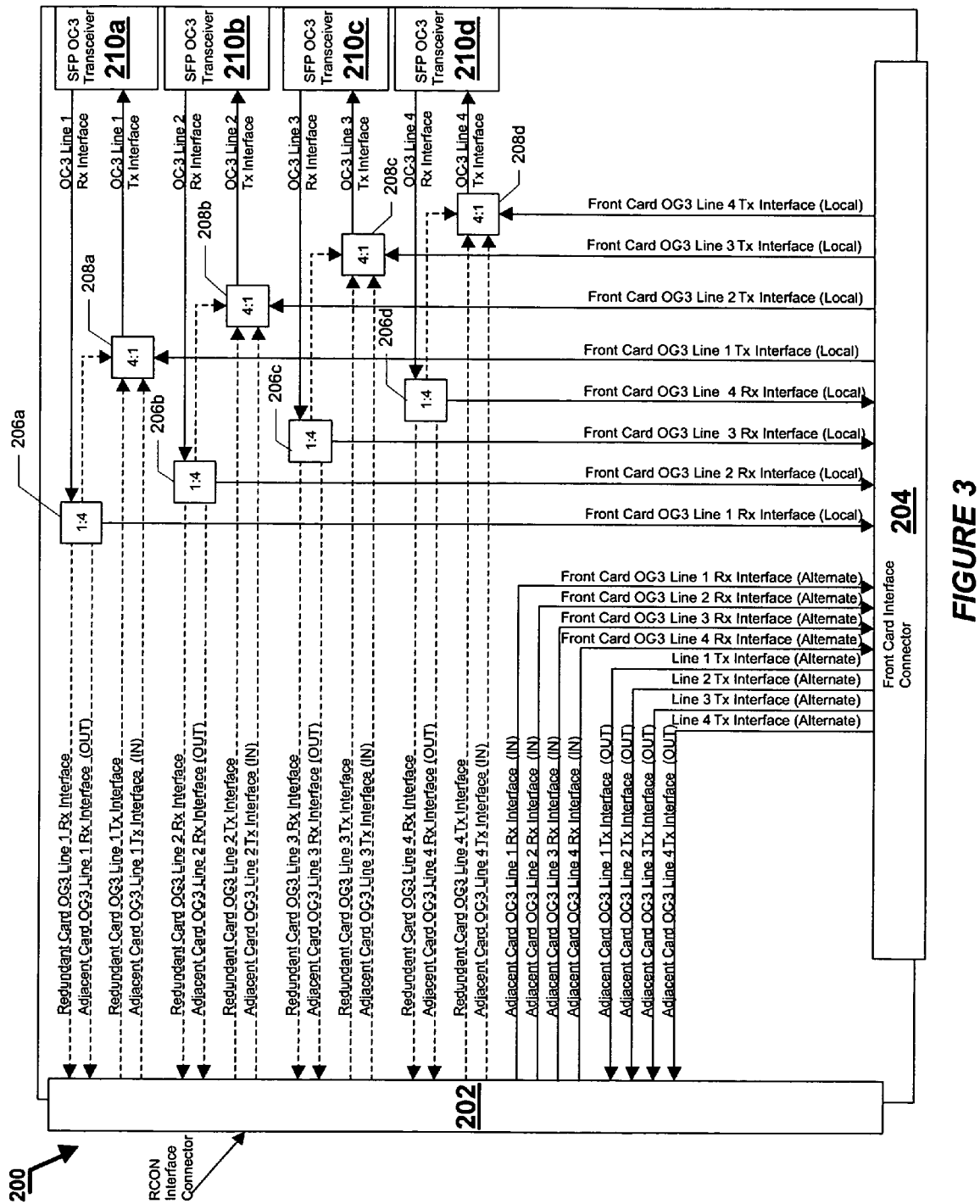
FIG. 3 is a block diagram of a back card with 4OC-3 line interfaces.

Referring now to FIG. 3, a block diagram of a particular embodiment of a back card 200 is shown. The back card provides four pluggable Small Form-factor Pluggable (SFP) transceivers 210a, 210b, 210c, 210d for supporting the OC-3/STM-1 interfaces. The back card 200 provides the data path between the OC-3/STM-1 framers on the front card and the broadband interfaces OC-3/STM-1 transceivers labeled 210a, 210b, 210c, and 210d on the back card 200 via the front card interface connector 204. The back card 200 also provides the data path between the OC-3/STM-1 framers present on the redundant front card and the broadband interfaces OC-3/STM-1 transceivers labeled 210a, 210b, 210c, and 210d on the back card 200 via the RCON Interface Connector 202 for providing 1:N front card redundancy. The back card 200 further provides the data path between the OC-3/STM-1 framers present on an Adjacent Front Card and the broadband interfaces OC-3/STM-1 transceivers labeled 210a, 210b, 210c, 210d on the back card 200 via the RCON interface connector 202 for 1:1 front card redundancy. For the receive path, the optical signals OC-3/STM-1 are converted to electrical signals STS-3/STM-1 by the SFP transceivers 210a, 210b, 210c, 210d and they are sent to 1:4 buffers 206a, 206b, 206c, 206d. These 1:4 buffers buffer the STS-3/STM-1 signals and send it to the front card via front card interface connector 204 for normal configuration and also send it to Redundant Front Card for 1:N equipment redundancy configuration as well as to Adjacent Front Card for 1:1 equipment redundancy configuration via RCON interface connector 202. For the transmit path, the electrical STS-3/STM-1 signals are received from the front card interface connector 204 for normal configuration and also from the adjacent front card for 1:1 equipment redundancy configuration as well as from Redundant front card for 1:N equipment redundancy configuration via RCON Interface connector 202. These electrical signals are sent to 4:1 multiplexers 208a, 208b, 208c, and 208d which are used for selecting the transmit path from the front card for normal configuration or from adjacent front card for 1:1 equipment redundancy implementation or redundant front card for implementing 1:N equipment Redundancy implementation. From the 4:1 multiplexers, the electrical STS-3/STM-1 signals are converted to the optical signals OC-3/STM-1) by the SFP transceivers 210a, 210b, 210c and 210d.

The mini-midplane 10 is mounted on the rear side of a gateway chassis to provide 1:N/1:1 equipment redundancy for the high-speed broadband interfaces with 1+1/1:N APS. The hardware utilized to implement the 1:N equipment protection scheme include the mini-midplane 10 for providing the data and control path traces 32, 34, 30, 36, 38 to every active slot 12, 14, 18, 20 and 22 respectively from the redundant slot 16, a redundant back card 100 with no line interface, and at least one back card 200a-200e with four OC-3/STM-1 broadband line interfaces. In this scheme, one front card of a gateway is used for protecting N active front cards in the system to utilize the system bandwidth to its fullest. N can be a maximum of 3 (1:3, 1:2 or 1:1 can be supported) or 5 (1:5, 1:4, 1:3, 1:2 or 1:1 can be supported) depending on different system configurations supported. The 1+1/1:N APS is supported along with the 1:1/1:N equipment protection.

Figure 4A:
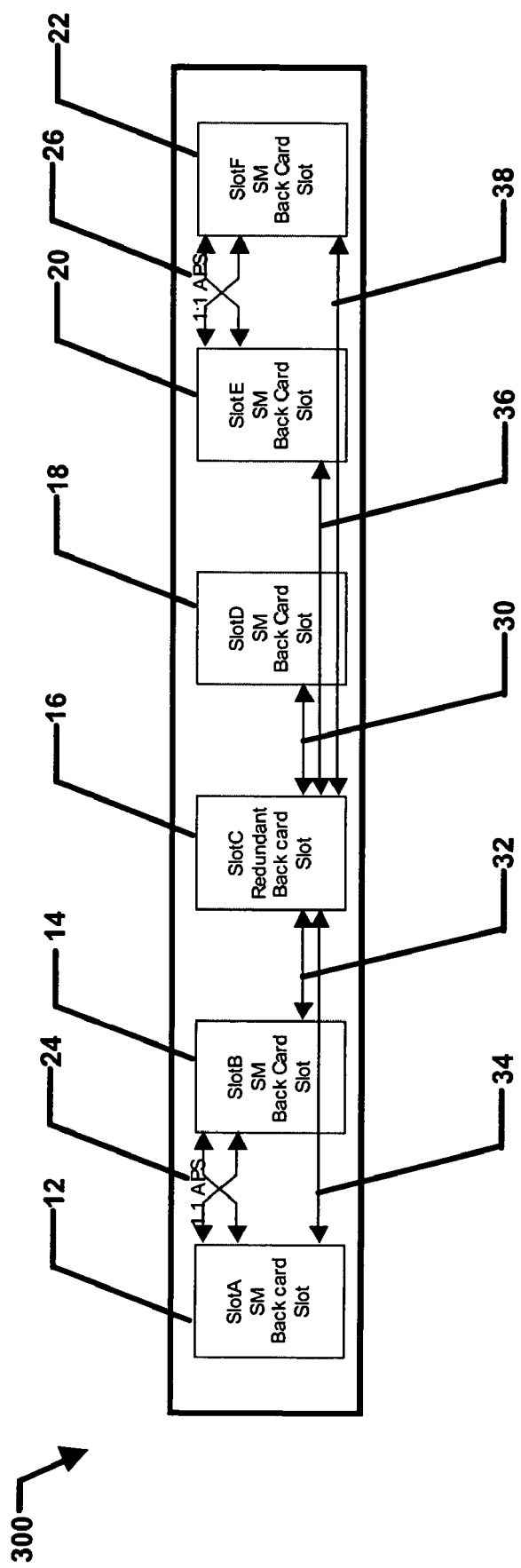
FIG. 4A is a block diagram for mini-midplane showing a data path for 1:N front card redundancy and datapath for 1:1 front card redundancy as well as 1:1 APS for selected slots.

Referring now to FIG. 4A, a block diagram of a particular embodiment of the mini-midplane 300 showing a data path, which is present between the slots of the mini-midplane 300, is shown. The mini-midplane 300 includes a first set of point-to-point traces 30 between the redundant slot 16 and active slot 18, a second set of point-to-point traces 32 between the redundant slot 16 and active slot 14, a third set of point-to-point traces 34 between the redundant slot 16 and active slot 12, a fourth set of point-to-point traces 36 between the redundant slot 16 and active slot 20, and a fifth set of point-to-point traces 38 between the redundant slot 16 and active slot 22 for implementing 1:N Equipment Protection for high speed broadband interfaces. The mini-midplane 300 further includes a first set of cross-coupled APS lines 24 between active slot 12 and active slot 14, and a second set of cross-coupled APS lines 26 between active slot 20 and active slot 22 for implementing 1:1 Equipment Protection for high speed broadband interfaces.

Figure 4B:
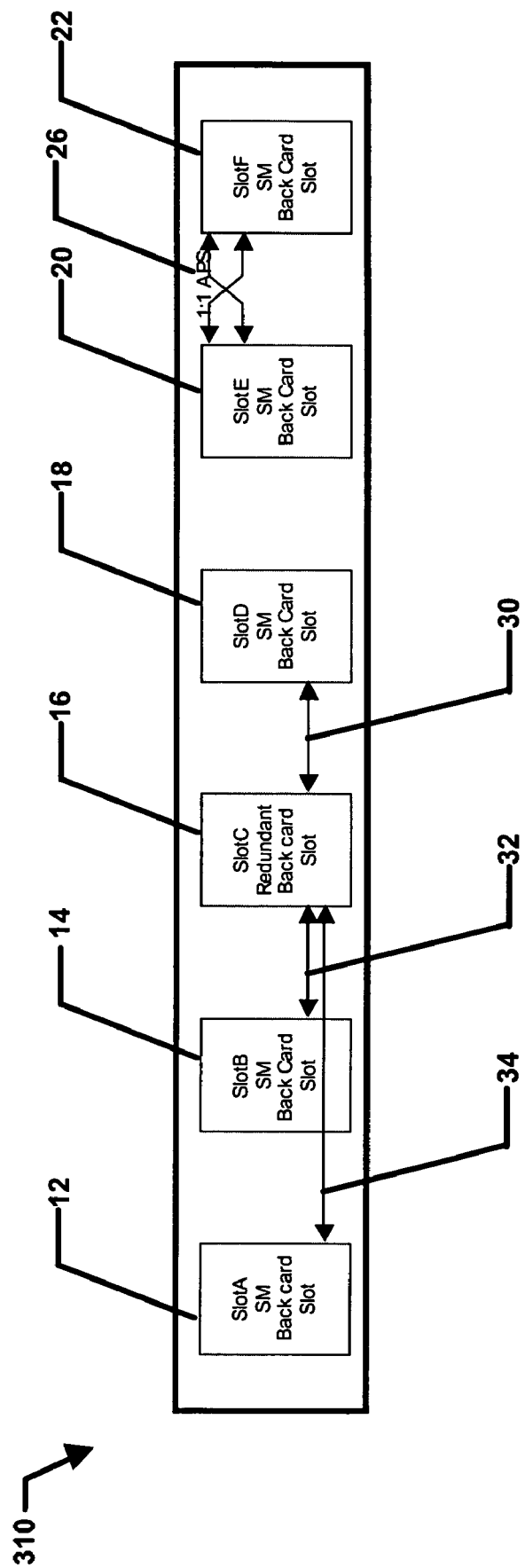
FIG. 4B is a block diagram showing a first configuration for 1:3 front card redundancy and 1:1 APS.

Referring now to FIG. 4B, a block diagram of a particular embodiment of the mini-midplane 310 showing a data path, which is present between the slots of the mini-midplane 310, is shown. The mini-midplane 310 includes a first set of point-to-point traces 30 between the redundant slot 16 and active slot 18, a second set of point-to-point traces 32 between the redundant slot 16 and active slot 14, and a third set of point-to-point traces 34 between the redundant slot 16 and active slot 12. The mini-midplane 310 further includes a set of cross-coupled APS lines 26 between active slot 20 and active slot 22. This configuration supports 1:3 redundancy scheme (slot 16 and slots 12, 14 and 18). The signals required for implementing 1:1 equipment protection for 1+1 APS configuration are also supported between slots 20 and 22.

Figure 4C:
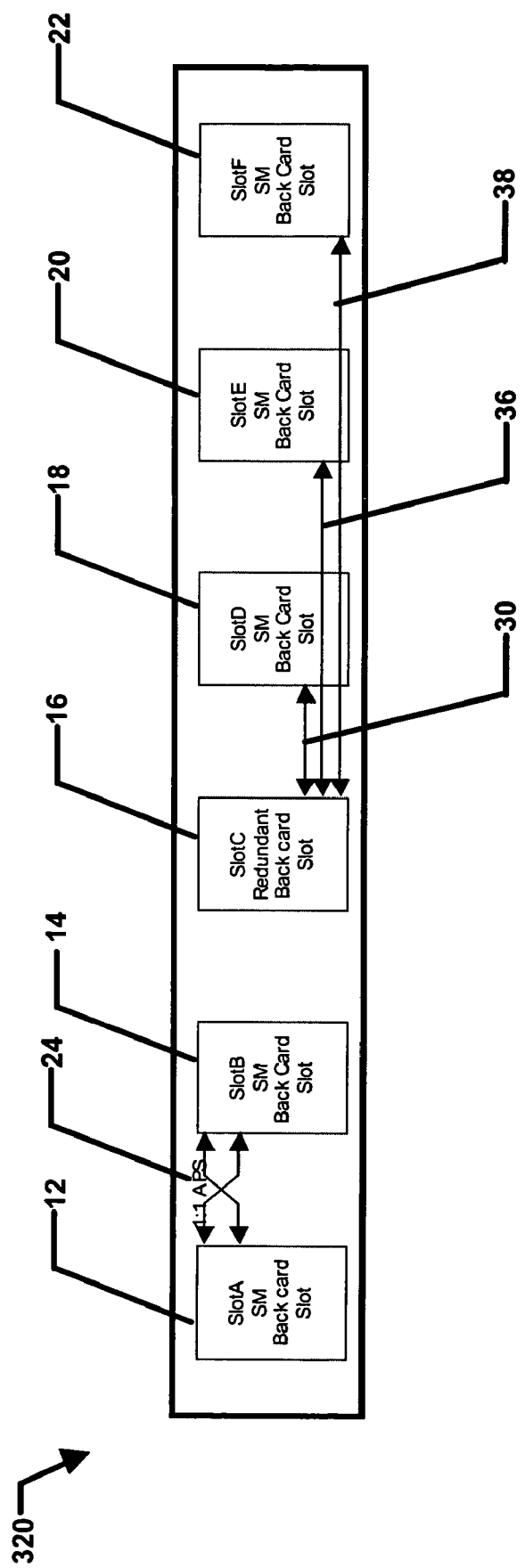
FIG. 4C is a block diagram showing a second configuration for 1:3 front card redundancy and 1:1 APS.

Referring now to FIG. 4C, a block diagram of a particular embodiment of the mini-midplane 320 showing a data path, which is present between the slots of the mini-midplane 320, is shown. The mini-midplane 320 includes a first set of point-to-point traces 30 between the redundant slot 16 and active slot 18, a second set of point-to-point traces 36 between the redundant slot 16 and active slot 20, and a third set of point-to-point traces 38 between the redundant slot 16 and active slot 22. The mini-midplane 320 further includes a set of cross-coupled APS lines 24 between active slot 12 and active slot 14. This configuration supports 1:3 redundancy scheme (slot 16 and slots (18, 20 and 22). The signals required for implementing 1:1 equipment protection for 1+1 APS configuration are also supported between slots 12 and 14.

Referring now to FIG. 4D, a block diagram of a particular embodiment of the mini-midplane 330 showing a data path, which is present between the slots of the mini-midplane 330, is presented. The mini-midplane 330 includes a first set of point-to-point traces 30 between the redundant slot 16 and active slot 18, a second set of point-to-point traces 32 between the redundant slot 16 and active slot 14, a third set of point-to-point traces 34 between the redundant slot 16 and active slot 12, a fourth set of point-to-point traces 36 between the redundant slot 16 and active slot 20, and a fifth set of point-to-point traces 38 between the redundant slot 16 and active slot 22. This configuration supports 1:5 equipment redundancy scheme.

Figure 5:
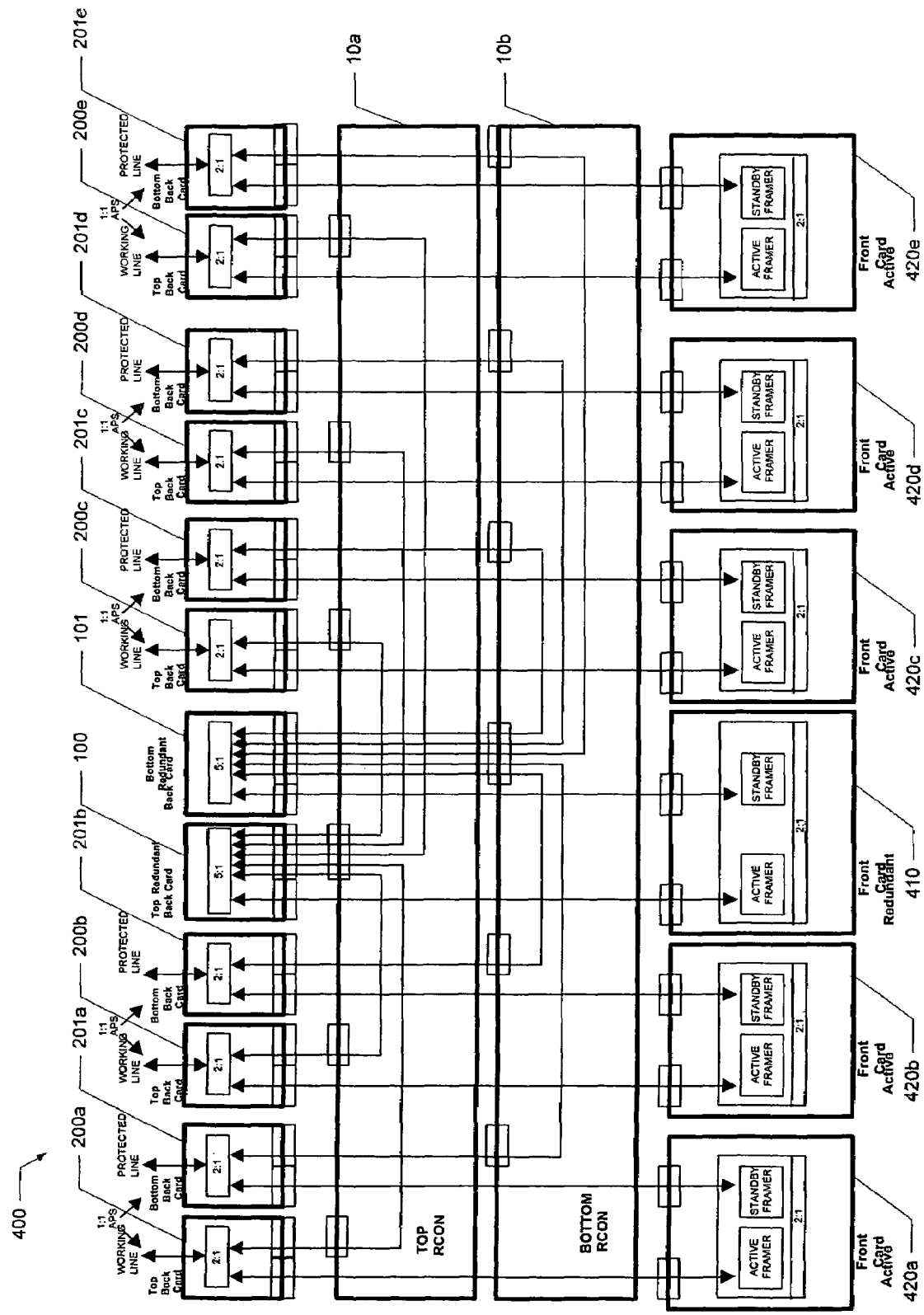
FIG. 5 is a block diagram of a gateway having two mini-midplanes for providing 1:N and 1:1 equipment redundancy for high speed broadband interfaces with 1+1 and 1:N automatic protection switching.

FIGS. 5-8 depict some different failure scenarios that are possible in the system using the 1:N equipment redundancy scheme. Referring now to FIG. 5, a block diagram for the 1:N equipment redundancy scheme 400 with N=5 is shown. Only one side of a gateway chassis is shown with top and bottom mini-midplanes 10*a* and 10*b* for one OC-3/STM-1 line in 1:5 Front Card redundancy. The top back cards 200*a*-200*e* carry working lines and the bottom back cards 201*a*-201*e* carry protected lines for each active Service Module (SM) card in 1:N equipment redundancy scheme. The bottom back cards 201*a*-201*e* are required to support 1+1 APS for the working lines carried by the top back cards 200*a*-200*e* in the system. The top mini-midplane 10*a* is required in the system to switch the working lines from any of the top back cards 200*a*-200*e* to redundant Front Card 410 for 1:N equipment protection. The bottom mini-midplane 10*b* is required in the system to switch the protected lines from any of the bottom back card 201*a*-201*e* to redundant Front Card 410 for 1:N equipment protection. The front cards 420*a*-420*e* are active cards. The same front card 410 is redundant Front Card that is used for protecting all other active cards in the system.

Figure 6:
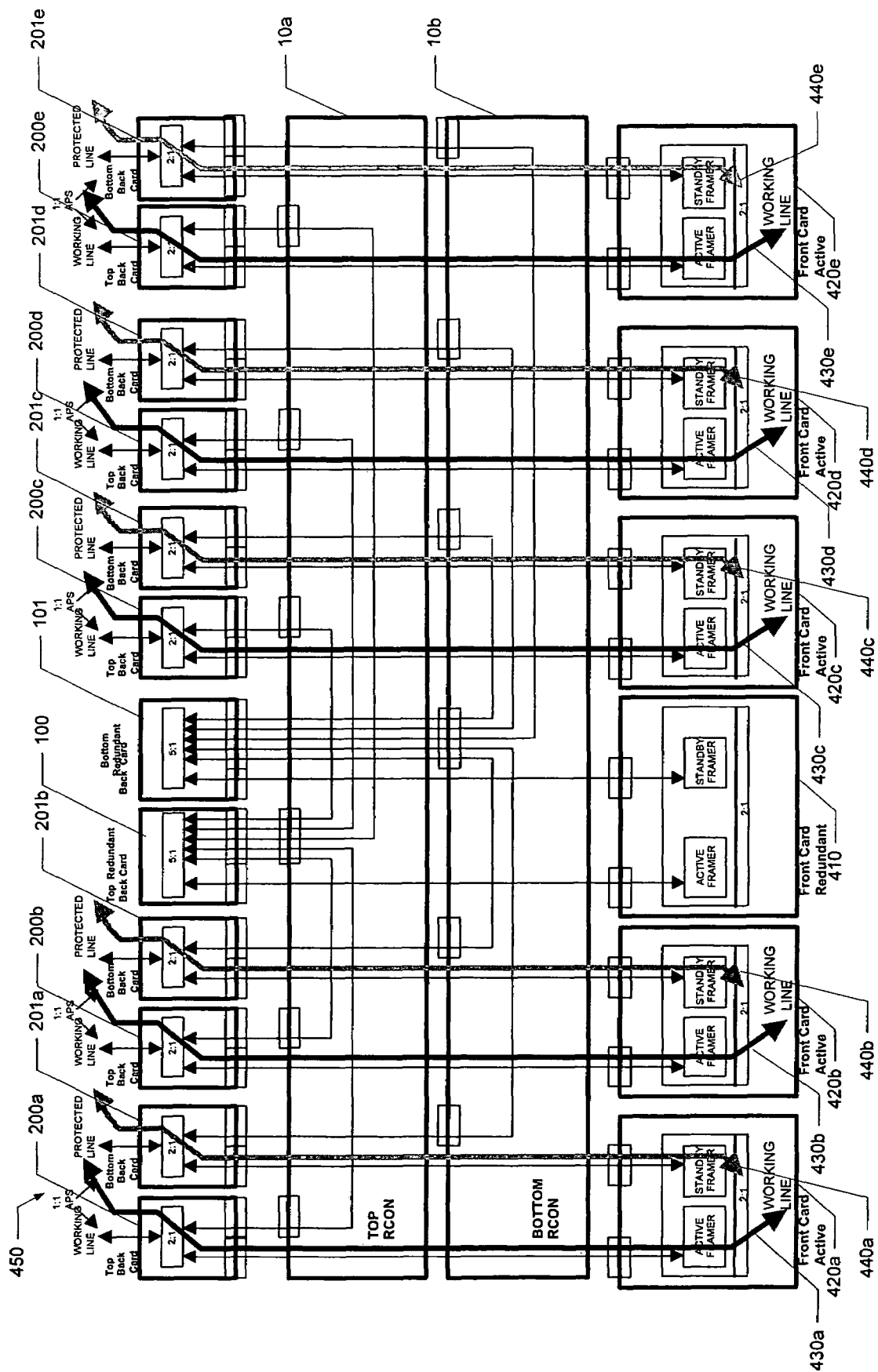
FIG. 6 is a block diagram of the configuration of FIG. 5 showing working lines and protected lines with no failure.

Referring now to FIG. 6, a "No Failure" Configuration 450 in 1:N equipment redundancy Scheme is shown. As shown in the figure, the bottom back cards 201*a*-201*e* are used in the system for 1+1 APS for the working lines 430*a*-430*e* on the top back cards. The top mini-midplane 10*a* is used for providing the data path from each top back card 200*a*-200*e* to the redundant front card 410 for working lines 430*a*-430*e*. The bottom mini-midplane 10*b* is used for providing the data path from each bottom back card 201*a*-201*e* to the redundant front card 410 for protected lines 440*a*-440*e*. There are 2:1 multiplexers in the back cards which are programmed for the transmit data path and there are 5:1 multiplexers in the redundant back card which is programmed for the receive data path, in case of 1:N equipment protection and they are programmed by the redundant front card 410. The 5:1 multiplexer is controlled directly by the Redundant Front Card via the front card connector. The control path for the 2:1 multiplexers is routed on the mini-midplanes 10*a*-10*b*. In the No Failure configuration 450, the 2:1 multiplexers on the backcard are configured from back card to front card and they are controlled by their respective front cards 420*a*-420*e*. The working lines 430*a*-430*e*, as well as the protected lines 440*a*-440*e*, are coming in to the front card 420*a*-420*e*. The data paths are shown in the block diagram for the flow of traffic in normal configuration. The top mini-midplane 10*a* and bottom mini-midplane 10*b* are not used for any control information when there is no failure in the system.

Figure 7:
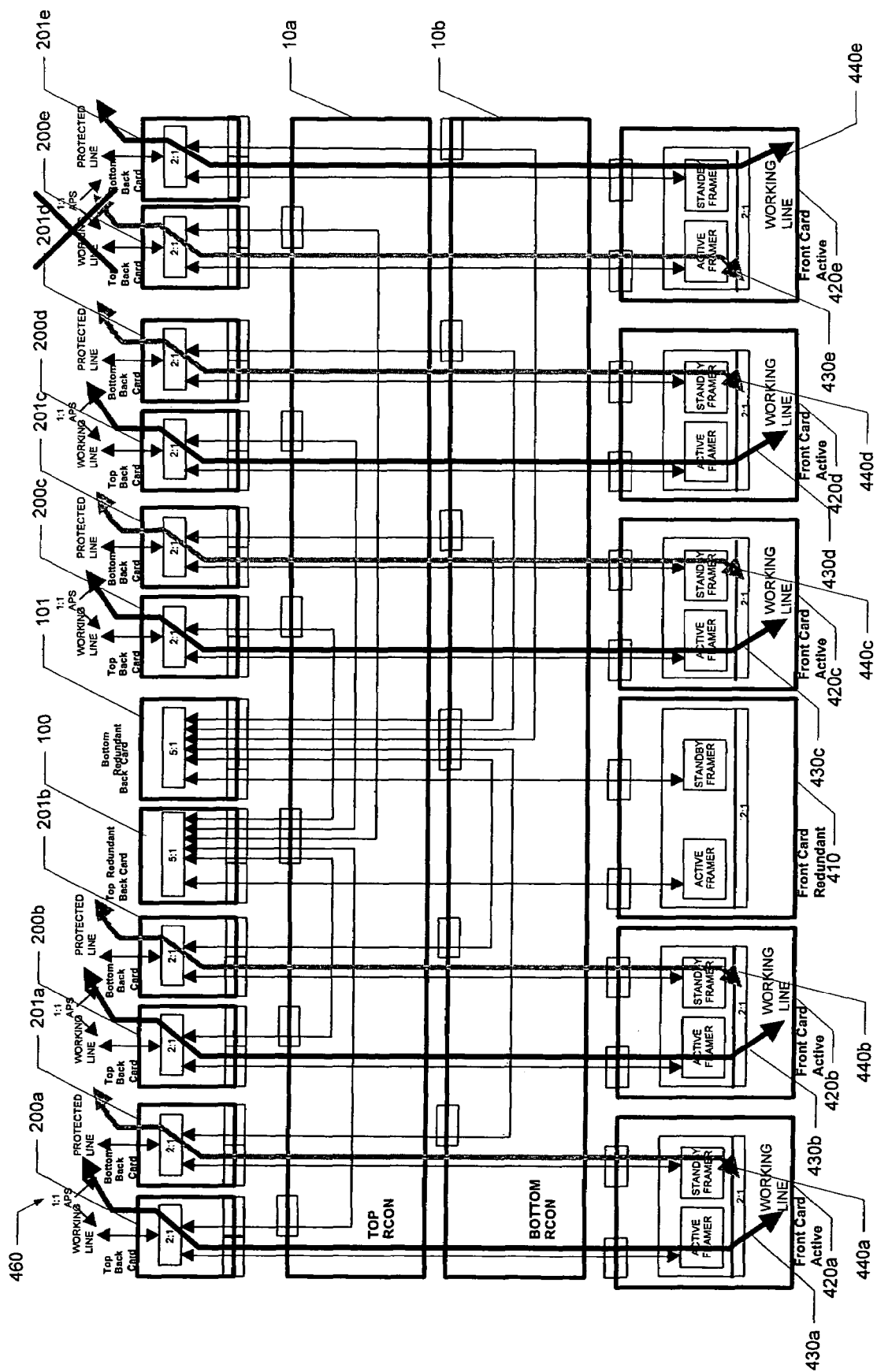
FIG. 7 is a block diagram of the configuration of FIG. 6 showing a working line failure.

Referring now to FIG. 7, a "Working Line Failure" Configuration 460 in a 1:N equipment redundancy scheme is shown. By way of example, suppose that the working line failure is on top back card 200*e* (the "X" in FIG. 7. The failure is detected by the Front Card 420*e* and the framers are programmed to start receiving the active traffic from the bottom back card 201*e*. The data paths are shown in the block diagram for the flow of traffic after protection switching occurs for 1+1 APS. The top mini-midplane 10*a* and bottom mini-midplane 10*b* are not used for any control information in this configuration also.

Figure 8:
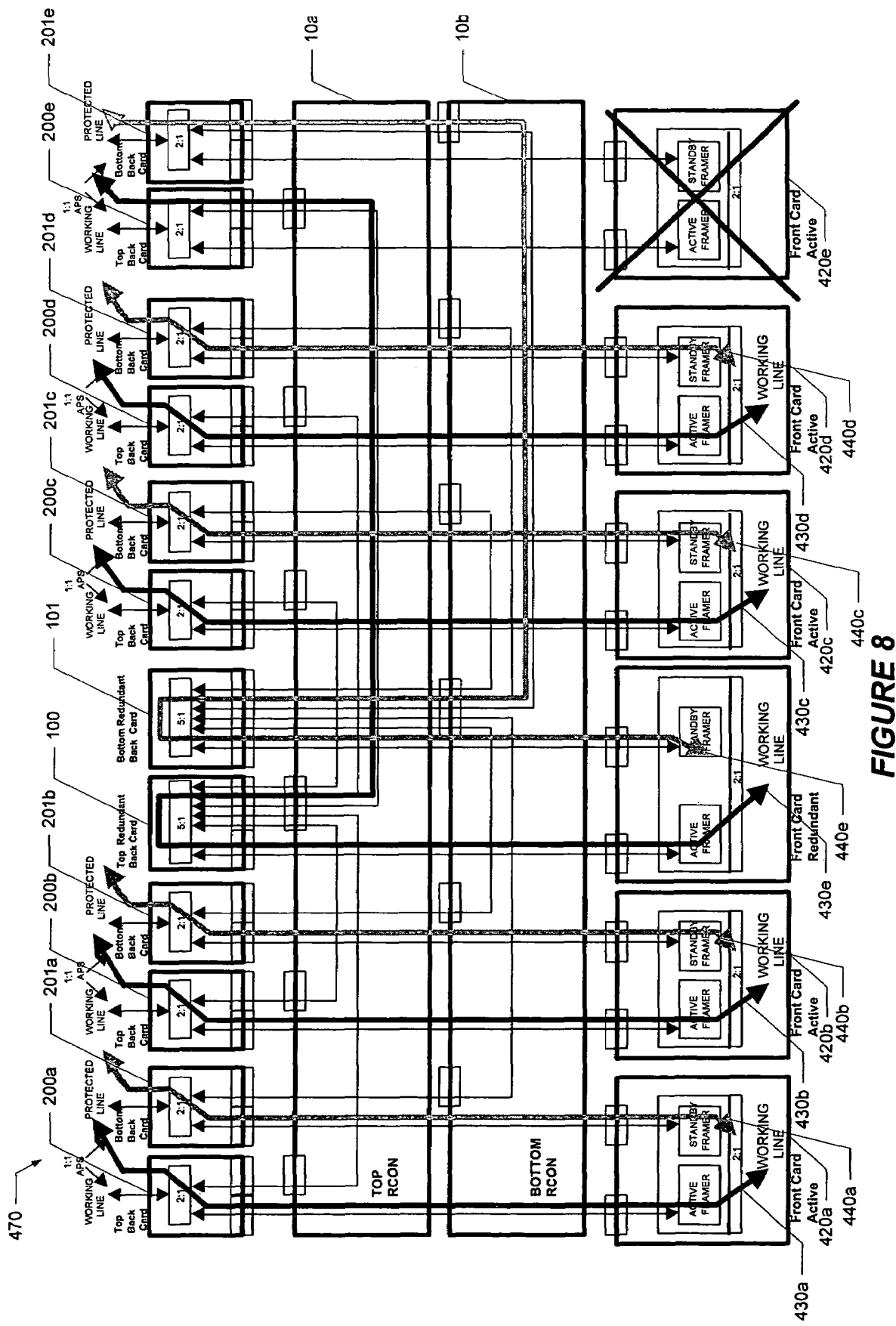
FIG. 8 is a block diagram of the configuration of FIG. 6 showing a front card failure.

Referring now to FIG. 8, a "Front Card Failure" Configuration 470 in a 1:N equipment redundancy Scheme is shown. The top mini-midplane 10*a* is used for providing the data path from each top back card 200*a*-200*e* to the redundant front card 410 for working lines 430*a*-430*e*. The bottom mini-midplane 10*b* is used for providing the data path from each bottom back card 201*a*-201*e* to the redundant front card 410 for protected lines 440*a*-440*e*. There are 2:1 multiplexers in the back cards which are programmed for the transmit data path in case of 1:N equipment protection and they can be programmed by the redundant front card 410 and the control path for the multiplexers is routed on the mini-midplane.

For illustrative purposes only, suppose that the failure is detected and a command is sent to redundant front card 410 to switchover the working line 430*e* as well as protected line 440*e* coming to front card 420*e* to redundant front card 410 (the "X" in FIG. 8). The redundant front card 410 will program the controller on the redundant back card for programming the 2:1 multiplexers on the back cards 200*e* and 201*e* to use transmit data path from the redundant front card 410 and not from its local front card. The 5:1 multiplexers present on the redundant back cards 100 and 101 are also controlled to transfer the traffic coming from back cards 200*e* and 201*e* to the redundant front card 410. The top and bottom mini-midplanes 10*a* and 10*b* are used for switching the data path as well to send the control information from the redundant front card 410 to the back cards 200*e* and 201*e*. The working line 430*e* and the protected line 440*e* are coming in to the redundant front card 410. The data paths are shown in the block diagram for the flow of traffic after protection switching occurs for 1:N front card protection.

In a 1:N equipment redundancy scheme, the front Card installed in Slot 16 will act as redundant front Card for the system. A redundant back card with no line interfaces and a back card with four OC-3/STM-1 line interfaces are utilized to implement the 1:N equipment protection scheme. N can be maximum of 5 for 1:N equipment redundancy purposes and N can be a maximum of 4 for line protection (1:N APS) purposes.

The bottom back cards are used for implementing 1+1 APS for the working lines coming on the top back cards in this 1:N equipment protection Scheme. The top back cards on the alternate slot are used for implementing 1+1 APS for the working lines coming on the top back card in the 1:1 equipment protection Scheme. This 1:N equipment protection scheme also emphasizes that the working lines are present on the top back card and the protection lines are present on the bottom back card. For implementing 1:N APS in 1:N equipment protection scheme, the protection line will be coming from the bottom back card and the working lines will be coming on the top back card.

In 1:N equipment protection scheme one front card is used to protect N active front cards in the system to utilize the system bandwidth to its fullest. N can be a maximum of 3 (1:3, 1:2, or 1:1 can be supported) or 5 (1:5, 1:4, 1:3, 1:2, or 1:1 can be supported) depending on different system configurations supported. The 1+1/1:N APS is supported along with 1:1/1:N equipment protection.

Figure 9:
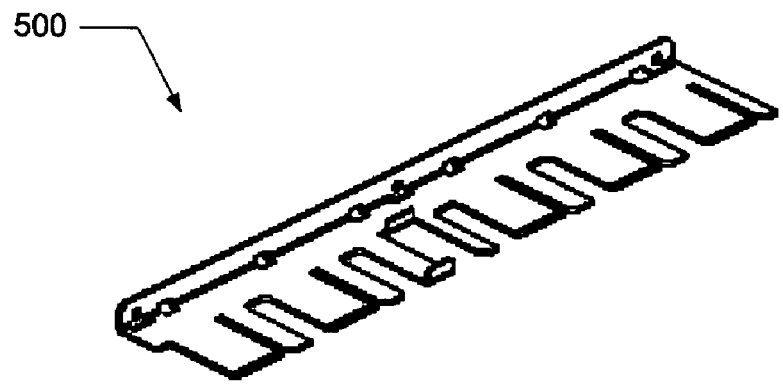
FIG. 9 is a diagram of a mini-midplane connector plate.

The redundant slot 16 on the mini-midplane is reserved for a redundant back card 100 only and no other back cards 200 can be installed in the redundant slot 16. The mechanical design ensures that the 4 OC-3 back cards designed to implement this 1:N equipment redundancy scheme can not be plugged into the redundant slot. FIG. 9 shows a mini-midplane bracket 500 configured to prevent insertion of a back card into the redundant back card slot.

Figure 10:
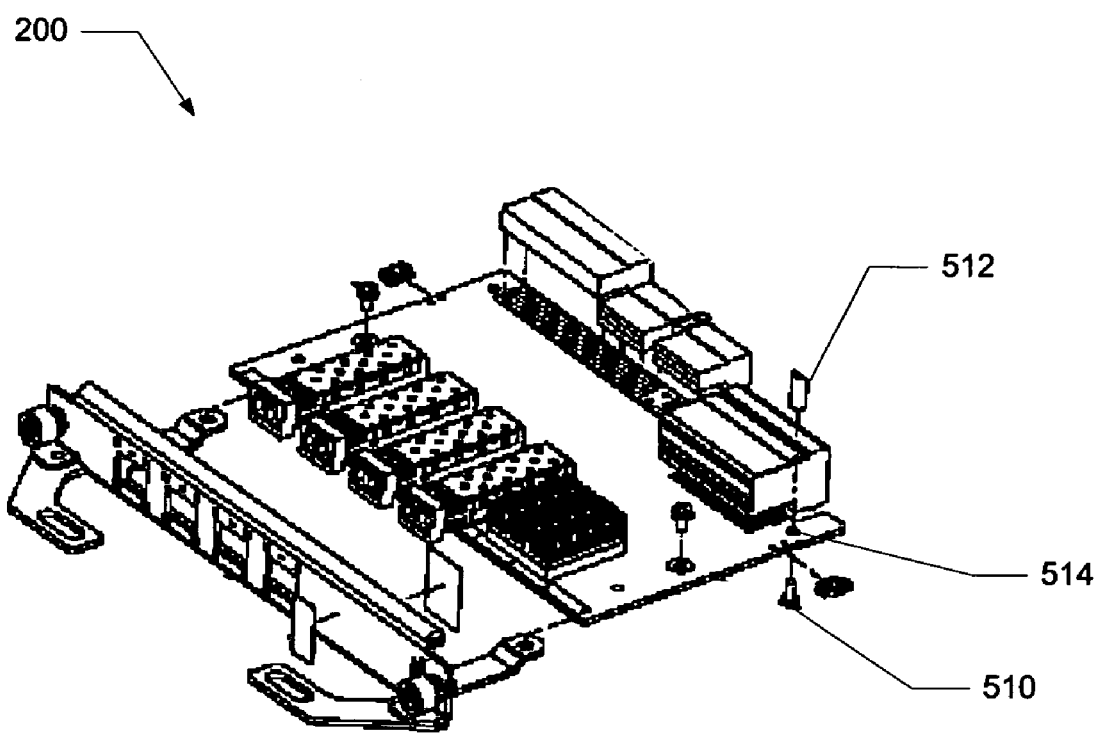
FIG. 10 is a diagram of a back card having a mechanism preventing insertion of a back card into a redundant slot.

Referring now to FIG. 10, a back card 200 is shown which includes an aperture 514 for receiving a screw 510 on one side of the card. A post 512, which is engageble with the screw 510 on an opposite side of the card 200 is mated with screw 510. The mechanical design also ensures that the existing legacy back cards, which can be plugged into mini APS midplane cannot be plugged into the redundant slot. The mechanical design also ensures that the redundant back card does not plug into active slots of the mini-midplane. These mechanical features protect the system from any failures occurring due to human error.

By way of the above described embodiments, an optimized, carrier grade platform that meets and/or exceeds the service provider's requirements for five nine's reliability, superior density and scalability, minimum power consumption, maximum space utilization and universal deployability is accomplished.

Reliability is one of the most important requirements of any carrier grade system. In order to be considered for mass deployment by service providers, voice over broadband hardware has to meet the reliability requirement of 'five nines' (i.e., a 99.999% availability). The gateway is based on a fully redundant midplane architecture and is built around a design that eliminates peripheral systems from the failure equation.

This invention offers a redundant mini-midplane in the architecture to support 1:N equipment redundancy as there are point to point traces in the mid-plane which are utilized for the data path in the case of primary card failure. The control paths are also kept point to point to manage the back cards, which were under the control of the primary front card, which failed.

Complete system redundancy is not optional in a system designed for service providers. For that reason, platforms destined for the central office are custom designed to ensure complete redundancy. At minimum, redundancy typically includes physical card redundancy, power redundancy, software redundancy, and timing redundancy. However, a carrier class product must also have a redundant midplane which is extremely difficult to achieve in most of the systems. Service providers need to ensure that the voice gateway they deploy is redundant to every bus and to every slot, and that no single point of failure can bring down the system or impede performance. As described above, there are point-to-point traces for high-speed broadband interfaces that are totally redundant. The reason why this apparatus itself is also redundant, is because of the presence of multiple mini-midplanes in the different quadrants of the gateway chassis so that one apparatus can be replaced in case of complete redundant configuration. This is one of the major benefits of this implementation as connectors present on the mini-midplane can also get damaged as result of back card insertions but there will be minimum impact on the availability of the platform in fully redundant configuration as this mini-midplane is field replaceable and can be re-installed.

A highly dense, highly scalable platform that lowers service provider risk and future proofs their investment is one of the toughest carrier grade requirements to fulfill. The lifespan of the voice over broadband gateway is a significant variable in the economics of deploying a service, and in the ultimate adoption of the new technology. The architecture of the midplane can be a tremendous enabler or an inhibitor of optimal density, scalable systems that eliminate the need for forklift upgrades, and the ability to leverage subtending and resource sharing to lower overall system cost. The presently disclosed apparatus is able to support flexible port densities as this invention maximizes the port densities in certain system configurations and certain applications without requiring a forklift upgrade of the chassis.

As gateways are already designed with very high bandwidth switch fabrics to meet the scalability demands, it is only at the higher densities that service providers are reaping the benefits of leveraging expensive resources, like ATM cell processing modules, across a greater number of revenue generating ports, drastically improving the cost per line. This type of scalability is only possible with a custom designed architecture that is not reliant on the OEM partner for fulfillment of the product road map. As the present apparatus is also a custom designed hardware specifically designed to address these scalability demands by providing 1:N equipment redundancy, it meets this criteria.

Scalability is about more than just density. Contrary to an enterprise data environment, service providers will not tolerate forklift upgrades. The ideal situation is to deploy the midplane technology only once. Service providers need to future proof their voice over broadband gateway investment to ensure that they will not be forced to make wholesale upgrades to their chosen gateway platform. By providing flexible choice of 1:N as well as 1:1 equipment redundancy schemes, this invention will future proof and lower the risk of service provider's investments.

Space, power, and scalability are all closely aligned. These three factors are critical as the enabling technology in the Telco environment. The space in the central office is tied closely to the amount of heat dissipation allowed, requiring that any new hardware introduced into the central office be designed specifically to utilize minimum space by delivering the highest degree of density at the lowest power.

Scalability is a figure of merit that describes how cost-effective a system is over a specified capacity range. In general, "high scalability" means a system supports a wide dynamic capacity range in a cost-effective manner. Therefore, cost-effectiveness is not simply defined by low equipment costs. It also includes the cost of items such as installation, maintenance, operating expenses, and capacity changes. For voice media equipment providers to attain carrier-class status, their systems must be highly scalable and are expected to deliver capacities from a few thousand connections to potentially several thousand connections. The dynamic property of scalability addresses the system's ability to cost-effectively change capacity after the initial installation. This is particularly important for Voice media systems, since it is likely they will initially be installed with limited capacity, followed by rapid deployment. During the introduction phase, the system's operation must be verified, personnel trained, and maintenance processes implemented. The system's capacity can then be rapidly increased during the deployment phase as older systems are removed from service. The system eventually enters the general availability phase where capacity changes are small and infrequent. Finally, when the system reaches the end of its useful life, its capacity is reduced as newer systems are introduced. The rapid changes in system capacity during the deployment and end of service phases represent the greatest risks. This is when a system's scalability is most critical. Since thousands of customers can be affected as their service is switched from one system to another, the performance of Voice media gateways must be seamless and unobservable by the consumer. Carrier-class scalability considers all of the costs associated with safely and efficiently changing capacity with minimal or no disruption of service. The capability to do 1:N scheme implementation to address the scalability requirement will essentially and effectively address this in Voice Markets.

By way of the presently disclosed apparatus, a backdoor hardware mechanism can be implemented by which an interrupt can be raised to the secondary card on event of failure to speedup the switchover in 1:N equipment redundancy scheme. If restoration is fast enough, there will be no perceptible interruption of the subscriber's voice applications. In other words, fast restoration can make failure events transparent to the subscriber. SONET/SDH has traditionally set the benchmark for transport-level service restoration at 50 milliseconds or less. The goal for service providers is to leverage the equipment redundancy deployed within the network by matching the restoration times. With this mechanism, the secondary card can start initializing/setting up the devices and can wait for the message from switch card before going in active state, which will minimize the time taken for the secondary card to restore the services offered by the failed active card.

Because the mini-midplane is a field replaceable hardware, it can be customized to address any future requirements. As the connectors on a midplane can get damaged while inserting the cards in the chassis, this can make the whole chassis useless because of the limitation of not being able to remove the connectors unless the whole chassis is powered down. While inserting the back cards, the connectors on the mini-midplane make the first contact with the back cards and absorb the insertion force. Since the mini-midplane can be removed, unforeseen damages will not bring down the whole chassis for this additional hardware model, which will increase the availability of the platform.

Currently the mini-midplane is used for OC-3/STM-1 as well as OC-12/STM-4 high speed interfaces for 1:N/1:1 equipment redundancy but the layout as well as the connector selection has been done to support OC-48 signaling rates on high speed interfaces which covers the platform for any future bandwidth requirements for these traces. The PCB material can also be changed fairly quickly from FR-4 to some other low dielectric material in case of some very high speed signaling requirements and can be upgraded in the field because the mini-midplane is field upgradeable. Additionally, the traces on the mini-midplane are currently defined to be used for AC Coupled Positive Emitter Coupled Logic (PECL) signaling but can be adapted for any signaling.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed is:

1. A reconfigurable apparatus providing 1:N redundancy, with N being an integer of 1 or greater, and 1:1 redundancy for high speed broadband interfaces with 1+1 and 1:N Automatic protection Switching (APS), with N being an integer of 1 or greater, the apparatus comprising:
    a mini-midplane having a redundant slot and a plurality of active slots, the mini-midplane providing communication with a gateway during use;
    at least one set of cross-coupled APS lines between a first active slot and a second active slot for implementing 1:1 equipment redundancy; and
    a plurality of point-to-point traces, each of said plurality of point-to-point traces being between said redundant slot and an individual one of said plurality of active slots for implementing 1:N equipment redundancy.

2. The apparatus of claim 1 further comprising a redundant back card inserted in said redundant slot and in communication with said mini-midplane.

3. The apparatus of claim 2 further comprising a plurality of back cards, wherein a respective one of said plurality of back cards are inserted in a respective active slot of said plurality of active slots, each of said plurality of back cards in communication with said mini-midplane.

4. The apparatus of claim 1 wherein said at least one set of cross-coupled APS lines include at least one port for implementing 1:1 equipment redundancy.

5. The apparatus of claim 1 wherein said plurality of point-to-point traces between said redundant slot and each of said plurality of active slots are for high speed broadband interfaces for implementing 1:N equipment redundancy.

6. The apparatus of claim 5 wherein said high speed broadband interfaces are selected from the group comprising Optical Carrier 3 (OC-3/STM-1) and Optical Carrier 12 (OC-12/STM-4).

7. The apparatus of claim 1 wherein said mini-midplane further includes a plurality of shared traces between said redundant slot and said at least one active slot.

8. The apparatus of claim 7 wherein said plurality of shared traces between said redundant slot and said at least one active slot are for low speed narrowband interfaces.

9. The apparatus of claim 8 wherein said low speed narrowband interfaces are selected from the group comprising T1 interfaces and E1 interfaces.

10. The apparatus of claim 1 wherein said plurality of point-to-point traces between said redundant slot and each of said active slots further comprises:
    a first plurality of point-to-point traces between said redundant slot and a first active slot;
    a second plurality of point-to-point traces between said redundant slot and a second active slot;
    a third plurality of point-to-point traces between said redundant slot and a third active slot;
    a fourth plurality of point-to-point traces between said redundant slot and a fourth active slot; and
    a fifth plurality of point-to-point traces between said redundant slot and a fifth active slot.

11. The apparatus of claim 10 wherein said at least one set of cross-coupled APS lines comprises:
    a first set of cross-coupled APS lines between said first active slot and said second active slot; and
    a second set of cross-coupled APS lines between said fourth active slot and said fifth active slot.

12. The apparatus of claim 1 wherein said plurality of point-to-point traces between said redundant slot and each of said active slots further comprises:
    a first plurality of point-to-point traces between said redundant slot and a first active slot;
    a second plurality of point-to-point traces between said redundant slot and a second active slot; and a third plurality of point-to-point traces between said redundant slot and a third active slot.

13. The apparatus of claim 12 wherein said at least one set of cross-coupled APS lines comprises a first set of cross-coupled APS lines between said fourth active slot and said fifth active slot.

14. The apparatus of claim 1 wherein said plurality of point-to-point traces between said redundant slot and each of said active slots further comprises:
a first plurality of point-to-point traces between said redundant slot and a third active slot;
a second plurality of point-to-point traces between said redundant slot and a fourth active slot; and
a third plurality of point-to-point traces between said redundant slot and a fifth active slot.

15. The apparatus of claim 14 wherein said at least one set of cross-coupled APS lines comprises a first set of cross-coupled APS lines between said first active slot and said second active slot.

16. The apparatus of claim 1 wherein said plurality of point-to-point traces between said redundant slot and each of said active slots further comprises:
a first plurality of point-to-point traces between said redundant slot and a first active slot;
a second plurality of point-to-point traces between said redundant slot and a second active slot;
a third plurality of point-to-point traces between said redundant slot and a third active slot;
a fourth plurality of point-to-point traces between said redundant slot and a fourth active slot; and
a fifth plurality of point-to-point traces between said redundant slot and a fifth active slot.

17. A reconfigurable apparatus providing 1:N, with N being an integer of 1 or greater, and 1:1 redundancy for high speed broadband interfaces with 1+1 and 1:N Automatic protection Switching (APS), with N being an integer of 1 or greater, the apparatus comprising:
a mini-midplane having a redundant slot and a plurality of active slots, the mini-midplane providing communication with a gateway;
a redundant back card inserted in said redundant slot and in communication with said mini-midplane, said redundant back card comprising;
a) a mini-midplane interface connector;
b) a front card interface connector;
c) a plurality of broadband transmit interface drivers, each of said broadband transmit interface drivers having an input coupled to said front card interface and a plurality of outputs coupled to said mini-midplane interface connector;
d) a plurality of broadband receive interface multiplexers, each of said broadband receive interface multiplexer having a plurality of inputs coupled to said mini-midplane interface connector and a output coupled to said front card interface connector; and
e) a redundant back card controller coupled to said mini-midplane interface connector, said front card interface connector and said multiplexer;
at least one set of cross-coupled APS lines between a first active slot and a second active slot for implementing 1:1 equipment redundancy; and
a plurality of point-to-point traces between said redundant slot and each of said plurality of active slots for implementing 1:N equipment redundancy.

18. A reconfigurable apparatus providing 1:N, with N being an integer of 1 or greater, and 1:1 redundancy for high speed broadband interfaces with 1+1 and 1:N Automatic protection Switching (APS), with N being an integer of 1 or greater, the apparatus comprising:
a mini-midplane having a redundant slot and a plurality of active slots, the mini-midplane providing communication with a gateway;
a redundant back card inserted in said redundant slot and in communication with said mini-midplane, said redundant back card comprising;
a) a mini-midplane interface connector;
b) a front card interface connector;
c) a plurality of pluggable Small Form-factor Pluggable (SFP) transceivers for providing optical/electrical conversion for the said broadband interfaces;
d) a plurality of broadband receive interface drivers, each of said broadband receive interface drivers having an input coupled to said pluggable SFP transceiver and a plurality of outputs coupled to said mini-midplane interface connector and said front card interface connector; and
e) a plurality of broadband transmit interface multiplexers, each of said broadband transmit multiplexer having a plurality of inputs coupled to said mini-midplane interface connector and to said front card interface connector, and an output coupled to said pluggable SFP transceiver;
at least one set of cross-coupled APS lines between a first active slot and a second active slot for implementing 1:1 equipment redundancy; and
a plurality of point-to-point traces between said redundant slot and each of said plurality of active slots for implementing 1:N equipment redundancy.

19. A reconfigurable apparatus providing 1:N redundancy, with N being an integer of 1 or greater, and 1:1 redundancy for high speed broadband interfaces with 1+1 and 1:N Automatic protection Switching (APS), with N being an integer of 1 or greater, the apparatus comprising:
a mini-midplane having a redundant slot and a plurality of active slots, the mini-midplane providing communication with a gateway;
at least one set of cross-coupled APS lines between a first active slot and a second active slot, said at least one set of cross-coupled APS lines including at least one port for implementing 1:1 equipment redundancy;
a plurality of point-to-point traces between said redundant slot and each of said plurality of active slots wherein said plurality of point-to-point traces between said redundant slot and each of said active slots are for high speed broadband interfaces, said broadband interfaces are selected from the group comprising Optical Carrier 3 and Optical Carrier 12, for implementing 1:N equipment redundancy for broadband interfaces; and
a plurality of shared traces between said redundant slot and said at least one active slot, wherein said plurality of shared traces between said redundant slot and said at least one active slot are for low speed narrowband interfaces, wherein said narrowband interfaces are selected from the group comprising T1 interfaces and E1 interfaces, for implementing 1:N equipment redundancy for narrowband interfaces.

20. The apparatus of claim 19 further comprising a redundant back card inserted in said redundant slot and in communication with said mini-midplane, wherein said redundant back card comprises:
a mini-midplane interface connector;
a front card interface connector;
a plurality of broadband transmit interface drivers, each of said broadband transmit interface drivers having an input coupled to said front card interface and a plurality of outputs coupled to said mini-midplane interface connector;

a plurality of broadband receive interface multiplexer, each of said broadband receive interface multiplexer having a plurality of inputs coupled to said mini-midplane interface connector and a output coupled to said front card interface connector; and a redundant back card controller coupled to said mini-midplane interface connector, said front card interface connector and said multiplexer.

21. The apparatus of claim 19 further comprising a plurality of back cards, wherein a respective one of said plurality of back cards are inserted in a respective active slot of said plurality of active slots, each of said back cards in communication with said mini-midplane, each of said back cards comprising:

a mini-midplane interface connector;
a front card interface connector;
a plurality of pluggable Small Form-factor Pluggable (SFP) transceivers for providing optical/electrical conversion for broadband interfaces;
a plurality of broadband receive interface drivers, each of said broadband receive interface drivers having an input coupled to said pluggable SFP transceiver and a plurality of outputs coupled to said mini-midplane interface connector, said front card interface connector; and
a plurality of broadband transmit interface multiplexers, each of said broadband transmit multiplexer having a plurality of inputs coupled to said mini-midplane interface connector and to said front card interface connector, and an output coupled to said pluggable SFP transceiver.

22. A system having 1:N and 1:1 equipment redundancy, with N being an integer of 1 or greater, for broadband interfaces and 1+1 and 1:N automatic protection switching, with N being an integer of 1 or greater, comprising:

a gateway comprising:
a back plane;
a redundant front card in communication with said back plane; and
a plurality of active front cards, each of said active front card in communication with said back plane;
a first reconfigurable apparatus comprising:
a first mini-midplane having a first redundant slot and a first plurality of active slots, the mini-midplane providing communication with said gateway;
at least one first set of cross-coupled APS lines between a first active slot and a second active slot of said first plurality of active slots for implementing 1:1 equipment redundancy;
a first plurality of point-to-point traces between said first redundant slot and each of said first plurality of active slots for implementing 1:N equipment redundancy;
a first redundant back card inserted in said first redundant slot and in communication with said first mini-midplane; and
a first plurality of back cards, wherein a respective one of said first plurality of back cards are inserted in a respective active slot of said first plurality of active slots, each of said first plurality of back cards in communication with said first mini-midplane; and
a second reconfigurable apparatus comprising:
a second mini-midplane having a second redundant slot and a second plurality of active slots, the second mini-midplane providing communication with said gateway;

at least one second set of cross-coupled APS lines between a first active slot and a second active slot of said second plurality of active slots for implementing 1:1 equipment redundancy;
a second plurality of point-to-point traces between said second redundant slot and each of said active slots of said second plurality of active slots for implementing 1:N equipment redundancy;
a second redundant back card inserted in said second redundant slot and in communication with said second mini-midplane; and
a second plurality of back cards, wherein a respective one of said second plurality of back cards are inserted in a respective active slot of said second plurality of active slots, each of said second plurality of back cards in communication with said second mini-midplane; and wherein said first apparatus provides communication between a plurality of working lines and said plurality of active front cards and wherein said second apparatus provides communication between a plurality of protected lines and said plurality of active front cards.

23. The system of claim 22 wherein said first mini-midplane further includes a first plurality of shared traces for narrowband interfaces between said first redundant slot and said at least one active slot of said first plurality of active slots for implementing 1:N equipment redundancy for low speed narrowband interfaces.

24. The system of claim 22 wherein said second mini-midplane further includes a second plurality of shared traces for narrowband interfaces between said second redundant slot and said at least one active slot of said second plurality of active slots for implementing 1:N equipment redundancy for low speed narrowband interfaces.

25. The system of claim 22 wherein said first redundant back card comprises:

a mini-midplane interface connector;
a front card interface connector;
a plurality of broadband transmit interface drivers, each of said broadband transmit interface drivers having an input coupled to said front card interface and a plurality of outputs coupled to said mini-midplane interface connector;
a plurality of broadband receive interface multiplexers, each of said broadband receive interface multiplexer having a plurality of inputs coupled to said mini-midplane interface connector and an output coupled to said front card interface connector; and
a redundant back card controller coupled to said mini-midplane interface connector, said front card interface connector and said multiplexer.

26. The system of claim 22 wherein said second redundant back card comprises:

a mini-midplane interface connector;
a front card interface connector;
a plurality of broadband transmit interface drivers, each of said broadband transmit interface drivers having an input coupled to said front card interface and a plurality of outputs coupled to said mini-midplane interface connector;
a plurality of broadband receive interface multiplexer, each of said broadband receive interface multiplexer having a plurality of inputs coupled to said mini-midplane interface connector and an output coupled to said front card interface connector; and a redundant back card controller coupled to said mini-midplane interface connector, said front card interface connector and said multiplexer.

27. The system of claim 22 wherein at least one back card of said first plurality of back cards comprises:
a mini-midplane interface connector;
a front card interface connector;
a plurality of pluggable Small Form-factor Pluggable (SFP) transceivers for providing optical/electrical conversion for the said broadband interfaces;
a plurality of broadband receive interface drivers, each of said broadband receive interface drivers having an input coupled to said pluggable SFP transceiver and a plurality of outputs coupled to said mini-midplane interface connector and to said front card interface connector; and
a plurality of broadband transmit interface multiplexers, each of said broadband transmit multiplexer having a plurality of inputs coupled to said mini-midplane interface connector and to said front card interface connector, and an output coupled to said pluggable SFP transceiver.

28. The system of claim 22 wherein at least one back card of said second plurality of back cards comprises:
a mini-midplane interface connector;
a front card interface connector;
a plurality of pluggable SFP transceivers for providing optical/electrical conversion for the said broadband interfaces (OC-3/STM-1)
a plurality of broadband receive interface drivers, each of said broadband receive interface drivers having an input coupled to said pluggable SFP transceiver and a plurality of outputs coupled to said mini-midplane interface connector, said front card interface connector;
a plurality of broadband transmit interface multiplexers, each of said broadband transmit multiplexer having a plurality of inputs coupled to said mini-midplane interface connector and front card interface connector and a output coupled to said pluggable SFP transceiver.

29. A reconfigurable apparatus comprising:
a mini-midplane having a redundant slot and a plurality of active slots, the mini-midplane configures to provide communication with a gateway;
means for providing 1:N redundancy for broadband interfaces;
means for providing 1:1 redundancy for said broadband interfaces;
means for providing 1+1 Automatic protection Switching (APS); and
means for providing 1:N APS,
wherein said means for providing 1:N redundancy for broadband interfaces and said means for providing 1+1 APS and said means for providing 1:N APS include a plurality of point-to-point traces between said redundant slot and an individual one of said active slots and wherein said means for providing 1:1 redundancy for said broadband interface and said means for providing 1+1 APS and said means for providing 1:N APS include at least one set of cross-coupled APS lines between a first active slot and a second active slot.

* * * * *